(12) United States Patent
Reeves (10) Patent No.: US 12,408,115 B2
(45) Date of Patent: Sep. 2, 2025

(54) MANAGING UPLINK TRANSMISSION POWER PLANS

(71) Applicant: T-MOBILE INNOVATIONS LLC, Overland Park, KS (US)

(72) Inventor: Raymond Emilio Reeves, Orlando, FL (US)

(73) Assignee: T-Mobile Innovations LLC, Overland Park, KS (US)

( * ) Notice: Subject to any disclaimer, the term of this patent is extended or adjusted under 35 U.S.C. 154(b) by 314 days.

(21) Appl. No.: 18/209,759

(22) Filed: Jun. 14, 2023

(65) Prior Publication Data

US 2024/0422689 A1   Dec. 19, 2024

(51) Int. Cl.
*H04B 7/00*   (2006.01)
*H04W 52/14*   (2009.01)
*H04W 52/28*   (2009.01)

(52) U.S. Cl.
CPC ....... *H04W 52/146* (2013.01); *H04W 52/283* (2013.01)

(58) Field of Classification Search
CPC . H04W 52/64; H04W 52/146; H04W 52/283; H04W 52/248; H04W 52/285; H04W 52/346
See application file for complete search history.

(56) References Cited

U.S. PATENT DOCUMENTS

| | | | |
|---|---|---|---|
| 11,924,782 B2 * | 3/2024 | Park | H04W 52/367 |
| 12,256,342 B2 * | 3/2025 | Kang | H04W 52/14 |
| 2021/0058872 A1 * | 2/2021 | Ryoo | H04W 52/146 |

* cited by examiner

*Primary Examiner* — Tuan Pham
(74) *Attorney, Agent, or Firm* — SHOOK, HARDY & BACON L.L.P.

(57) ABSTRACT

Systems and methods are provided for managing uplink transmission power (UTP) plans for user devices. A manager can assess UTP adjustment criteria to determine if an updated UTP plan should be activated for the user device. UTP plans may need to be updated when devices are transmitting too much power or not enough in order to be received by a telecommunications network. Updated UTP plans can increase or decrease the power transmitted by the device.

20 Claims, 5 Drawing Sheets

MANAGING UPLINK TRANSMISSION POWER PLANS

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

In aspects set forth herein, systems and methods are provided for managing uplink transmission power plans. More particularly, in aspects set forth herein, systems and methods enable dynamic management of uplink transmission power plans. Increased mobility of mobile users continues to raise concerns over the impact that distance and motion between cell towers and served user equipment (UE) have on performance and user experience. Expansion of UEs to support satellite cellular services (SCS) compounds this issue with the extreme conditions and distances SCSs introduce. Aspects herein provide systems and methods that modify existing networks and UE components to support a UE transmission attenuation habituation architecture where a manager can manage/control uplink transmission power (UTP) plans for UEs based on specific factors.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
APN Access Point Name
CD-ROM Compact Disk Read Only Memory
CDMA Code Division Multiple Access
eNode B Evolved Node B
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MIMO Multiple Input Multiple Output
MD Mobile Device
PC Personal Computer
PCS Personal Communications Service
PDA Personal Digital Assistant
RAM Random Access Memory
RET Remote Electrical Tilt
RF Radio-Frequency
RFI Radio-Frequency Interference
R/N Relay Node
ROM Read Only Memory
SCS Satellite Cellular Service
SINR Transmission-to-Interference-Plus-Noise Ratio
SNR Transmission-to-noise ratio
SON Self-Organizing Networks
TDMA Time Division Multiple Access
TXRU Transceiver (or Transceiver Unit)
UDM Unified Data Management Function
UE User Equipment Further, various technical terms are used throughout this description. An illustrative resource that fleshes out various aspects of these terms can be found in Newton's Telecom Dictionary, 32d Edition (2022).

As used herein, the term "node" is used to refer to network access technology for the provision of wireless telecommunication services from a base station to one or more electronic devices, such as an eNodeB, gNodeB, etc.

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., cell sites, cell towers) to provide network coverage. The base stations are employed to broadcast and transmit transmissions to user devices of the telecommunications network. An access point may be considered to be a portion of a base station that may comprise an antenna, a radio, and/or a controller.

As employed herein, a UE (also referenced herein as a user device) or WCD can include any device employed by an end-user to communicate with a wireless telecommunications network. A UE can include a mobile device, a mobile broadband adapter, or any other communications device employed to communicate with the wireless telecommunications network. A UE, as one of ordinary skill in the art may appreciate, generally includes one or more antenna coupled to a radio for exchanging (e.g., transmitting and receiving) transmissions with a nearby base station.

The present disclosure is directed to managing UTP plans. Increased mobility of mobile users continues to raise concerns over the impact that distance and motion between cell towers and served user equipment/devices (UEs) have on performance and user experience. Expansion of UEs to support satellite cellular services (SCS) compounds this issue with the extreme conditions and distances SCSs introduce. Aspects herein provide systems and methods that modify existing networks and UE components to support a UE transmission attenuation habituation architecture where a manager can manage/control uplink transmission power (UTP) plans for UEs based on specific factors.

For example, users vacationing in Utah's Uinta Mountains at heights over eleven thousand feet can find themselves in zero terrestrial coverage with only SCSs to their avail, which may not necessarily be available on each satellite either due to technical or administrative reasons. In practical terms, this means that dedicated overhead satellites moving at numbingly fast speeds would engage in increasingly complex and numerous power control interactions that would impact system efficiency, performance, and effective bandwidth. Moreover, present solutions do not allow for the anticipated scenarios of the previously mentioned hikers (Uinta Mountains) might present where they can camp out at high altitudes and cool temperatures. Similarly, while not as extreme, this situation may have similar conditions to users enjoying high speed cross-country trips in sparce coverage conditions where there are plenty of power sources and comfortable climate conditions.

Figure 1A:
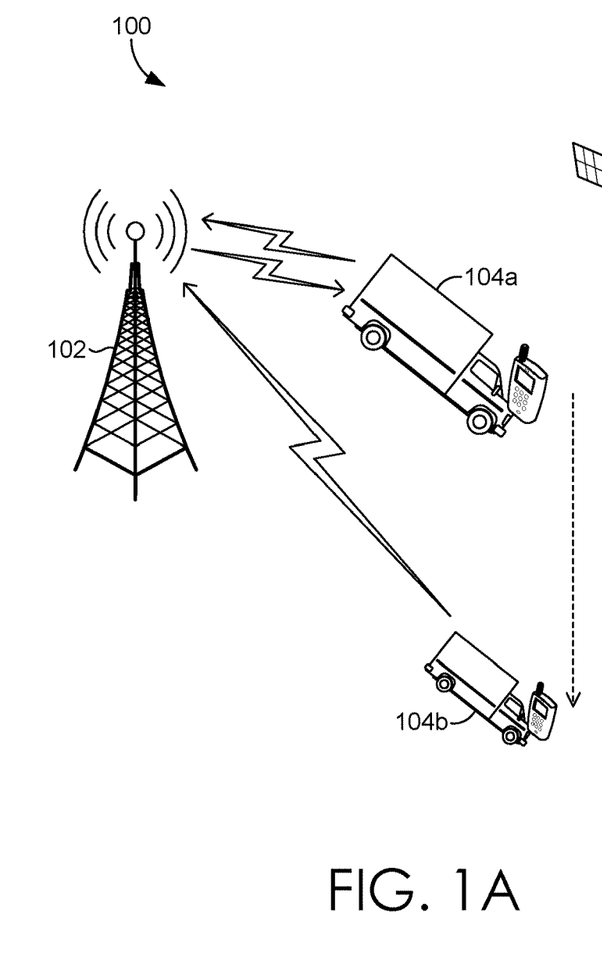
FIG. 1A depicts a diagram of an exemplary environment in which implementations of the present disclosure may be employed, in accordance with aspects herein.
Figure 1B:
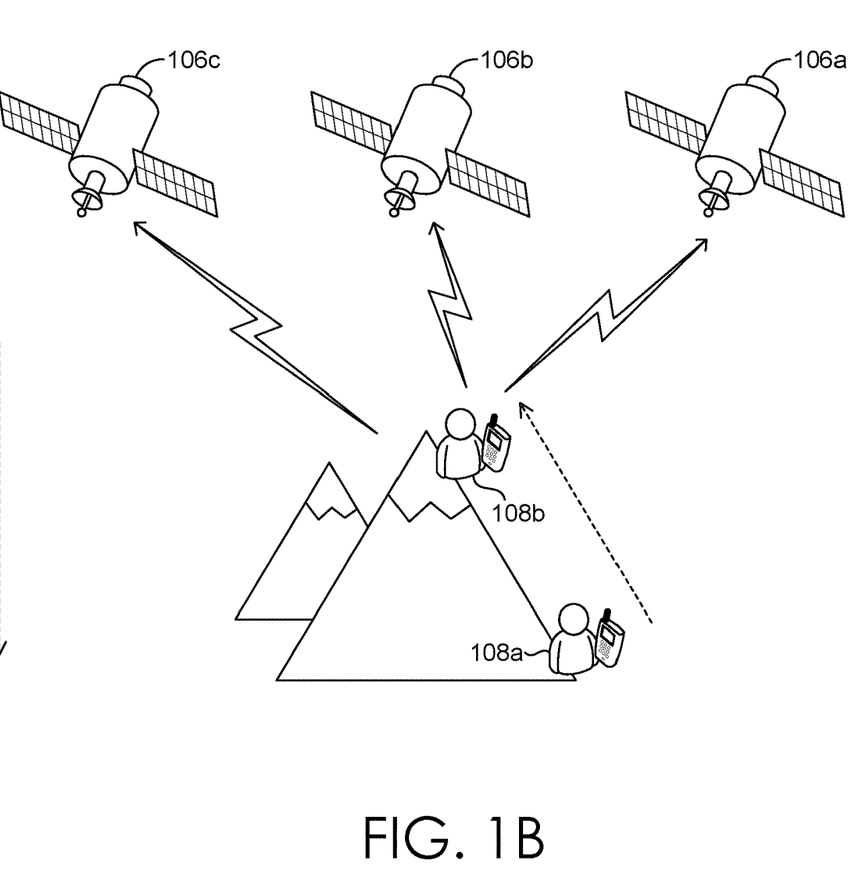
FIG. 1B depicts a diagram of an exemplary environment in which implementations of the present disclosure may be employed, in accordance with aspects herein.

The above-mentioned examples are depicted in FIGS. 1A and 1B. FIG. 1A depicts the example of a vehicle traveling at high speeds further from a telecommunications tower 102. At a first location 104a the vehicle is closer to tower 102 and, thus, less power is needed to communicate with the tower 102. However, the further the vehicle travels, such as to location 104b, the more power is needed to still communicate with tower 102.

Similarly, as shown in FIG. 1B, one or more SCSs (shown as satellite 106a, satellite 106b, and satellite 106c) may be present and utilized by a user. A user in position 108a may be closer to a terrestrial source, such as a tower similar to tower 102 shown in FIG. 1A, while a user that has climbed a mountain and is at position 108b may actually be closer to any one of satellites 106a-106c. The closer the source, the less power the UE needs to successful communicate with the source. Furthermore, the user, the satellite, or both, are continuously moving so the user at 108b may be closest to satellite 106b at a first point in time, but closer to satellite 106c at a second point in time (or satellite 106a) depending on the direction of movement of the user, the satellites, or a combination thereof.

Presently, a UE may be getting further and further from a source (e.g., cell tower) and power levels are continuing to rise because of the increased signal needed to communicate with the tower, but there is no adjustment to a power plan to ease the burden on the UE. Aspects herein provide systems, methods, and computer-readable media that modify existing network and UE components to support a UE transmission attenuation habituation (UTAH) architecture whereby UTAH-capable UEs can interact with a UTAH manager responsible for keeping track of all UTAH-capable UEs for mobility as well as environmental criteria. Environmental criteria can include, but is not limited to, power determinations (e.g., is the UE tethered to external power (e.g., solar, power grid, etc.)), climate conditions (e.g., temperature), and the like. The UTAH-manager can also access a travel path (using current location, current speed, target destination, or a combination thereof) of the user and UE, the type of UE and power available to the UE, average speed of the UEs movements, any power constraints of the UE, and the like.

With these details from active UTAH-capable UEs, in addition to historical performance data across one or more other coverage areas, the UTAH-manager can know the present location and predict the future location of one or more service towers, either fast-fading or fast-approaching ground towers or fast-moving satellites. The UTAH-manager can recommend and implement updated UTP plans directing each UTAH-capable UE when to increase or decrease transmission power levels independent of standard power limits reserved for handheld, temperature-sensitive, battery-limited UEs. In other words, the updated UTP plan can have power level values that are outside of values generally set as thresholds for the particular UE. Physics tells us where the user and any approaching service sources (e.g., ground towers, satellites, or the like) will be at any point in time and power needs for each location is also accessible to the UTAH-manager to manage UTP plans.

For example, an updated UTP plan can instruct a UTAH-capable UE to decrease UTP to the historical optimal level (based on similarly behaving UEs) as a specific satellite approaches overhead with minimal loss or when nearing the service node in the travel path. A UTP plan may also need to be adjusted to decrease power when the UE is signaling too loudly (e.g., too many signals sent based on close proximity to service source). When the UE is signaling frequently, it is using more energy and operating less efficiently.

In addition to generating updated UTP plans for any specific UTAH-capable UE, the UTAH-manager can also determine whether any set of other UEs would benefit from said UTP plan and instruct the other UEs to modify their behavior through an updated UTP plan. The updated UTP plan for the other UEs can be a time-limited UTP plan, which may be the result of the UEs opting into a joint experience (e.g., like in the case of a road trip or a group hiking experience) or a smart detection of similar environmental criteria (by the UTAH-manager), thereby reducing the computational burden on a centralized UTAH-manager. UTP plans can be time-limited (e.g., expire at a specific time or after a predetermined period of time elapses) or endpoint-bound based on the service source (e.g., a better tower may require less power to communicate with it so the manager can dynamically alter the UTP plan based on the source with which it is communicating).

Aspects herein allow for UTAH-capable UEs to get non-standard power control behavior while taking full advantage of transmission power levels possible outside the battery and temperature constraints typically limiting a UE while at the same time projecting power levels ahead of time instead of continuous adjustments that would further reduce the units of signal that could otherwise be used for bandwidth.

Accordingly, a first aspect of the present disclosure is directed to a system for managing uplink transmission power (UTP) plans. The system comprises one or more processors and one or more computer-readable media storing computer-usable instructions that, when executed by the one or more processors, cause the one or more processors to: identify a trigger to initiate adjusting an uplink transmission power (UTP) plan for a first device; identify one or more UTP adjustment criteria; and activate an updated UTP plan for the first device based on the one or more UTP adjustment criteria.

A second aspect of the present disclosure is directed to a method for managing uplink transmission power plans. The method comprises: identifying a trigger to initiate adjusting an uplink transmission power (UTP) plan for a first device; identifying a location of at least one upcoming service source; identifying one or more UTP adjustment criteria; and activating an updated UTP plan for the first device based on the one or more UTP adjustment criteria.

Another aspect of the present disclosure is directed to a method for managing uplink transmission power plans. The method comprises: identifying a trigger to adjust a first UTP plan for a first device; identifying one or more UTP plan criteria comprising at least one environmental factor; dynamically adjusting the first UTP plan for the first device, wherein the first UTP plan is adjusted to decrease power levels; identifying a second device having a second UTP plan within a predetermined distance of the first device; and adjusting the second UTP plan of the second device to mirror the first UTP plan of the first device.

Figure 2:
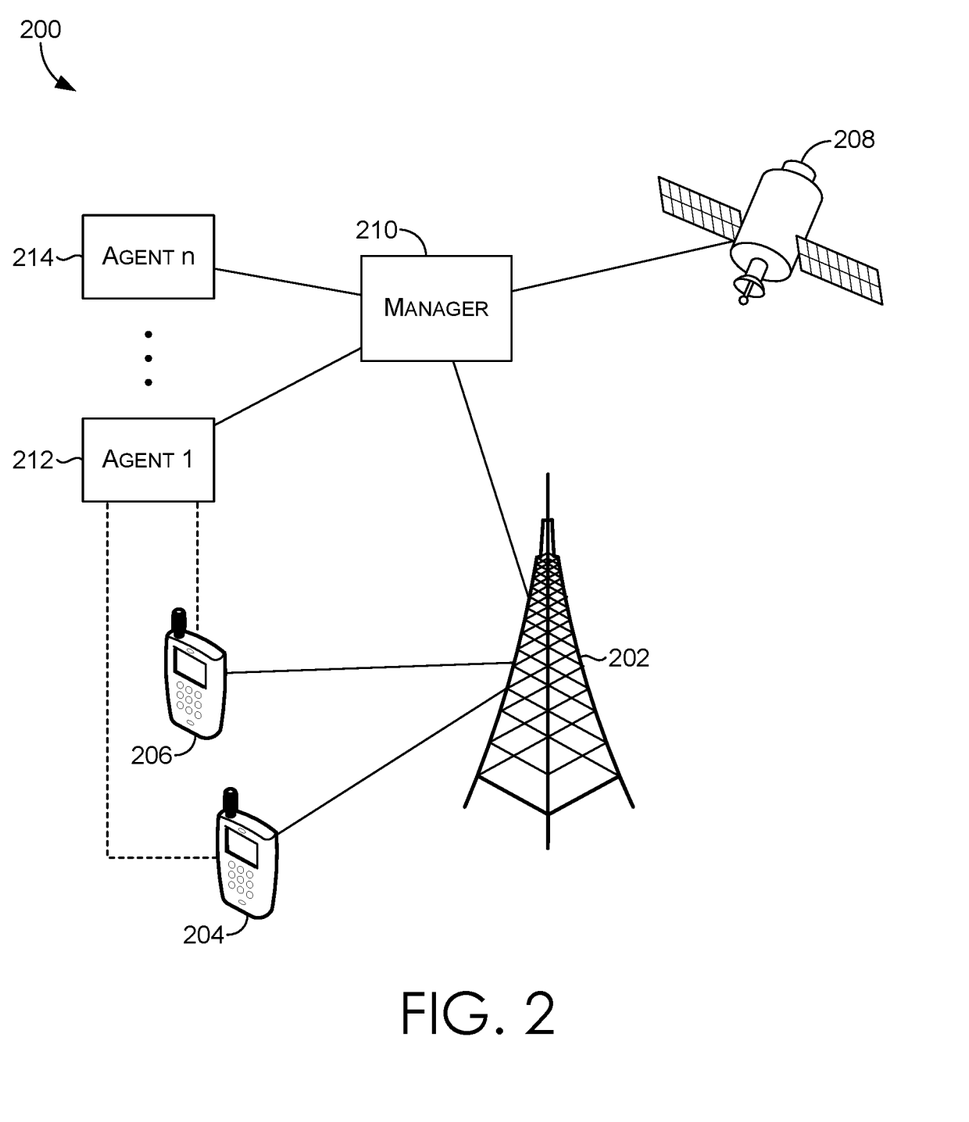
FIG. 2 depicts a diagram of an exemplary network environment in which implementations of the present disclosure may be employed, in accordance with aspects herein.

Turning to FIG. 2, a network environment suitable for use in implementing embodiments of the present disclosure is provided. Such a network environment is illustrated and designated generally as network environment 200. Network environment 200 is but one example of a suitable network environment and is not intended to suggest any limitation as to the scope of use or functionality of the disclosure. Neither should the network environment 200 be interpreted as having any dependency or requirement relating to any one or combination of components illustrated.

Figure 5:
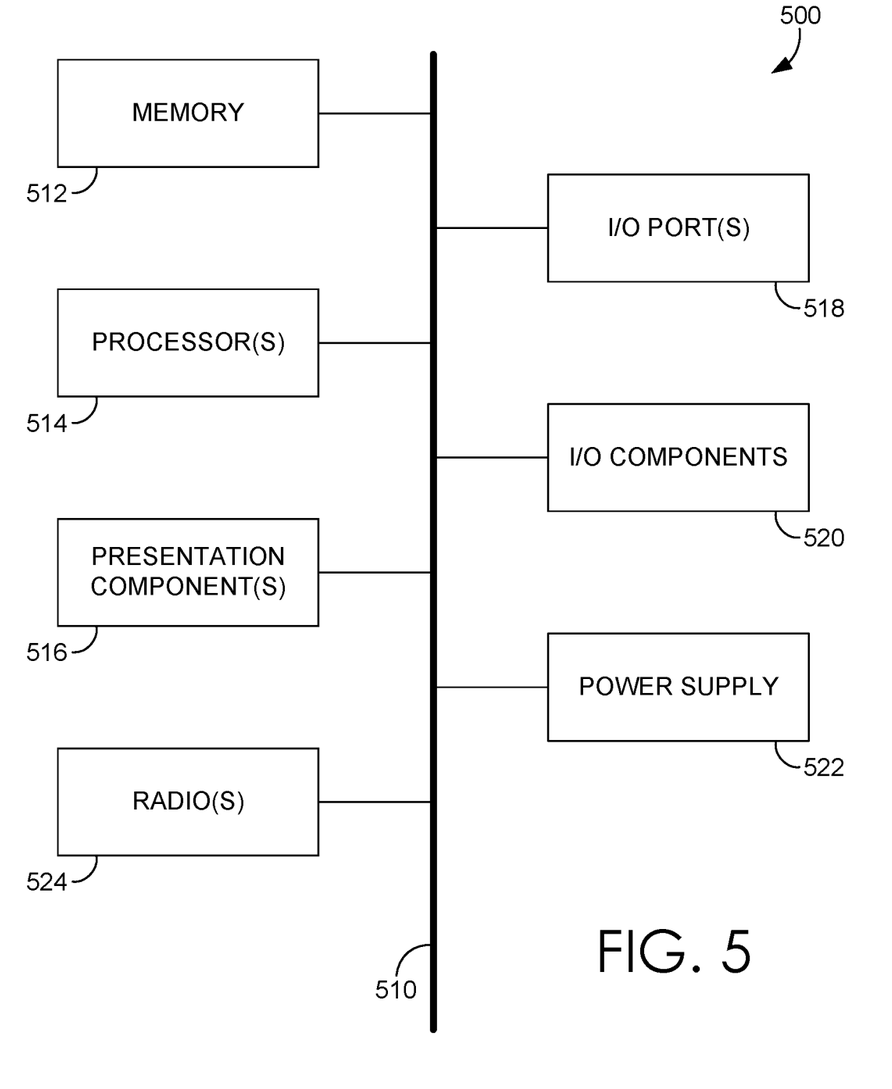
FIG. 5 depicts a diagram of an exemplary computing environment suitable for use in implementations of the present disclosure, in accordance with aspects herein.

A network cell may comprise a base station to facilitate wireless communication between a communications device within the network cell, such as communications device 500 described with respect to FIG. 5, and a network. As shown in FIG. 2, communications device may be UE 204 and UE 206. In the network environment 200, UE 204 or UE 206 may communicate with other devices, such as mobile devices, servers, etc. The UE 204 or UE 206 may take on a variety of forms, such as a personal computer, a laptop computer, a tablet, a netbook, a mobile phone, a Smart phone, a personal digital assistant, or any other device capable of communicating with other devices. For example, the UE 204 or UE 206 may take on any form such as, for example, a mobile device or any other computing device capable of wirelessly communication with the other devices using a network. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, UE 102 comprises a wireless or mobile device with which a wireless telecommunication network(s) can be utilized for communication (e.g., voice and/or data communication). In this regard, the UE 204 or UE 206 can be any mobile computing device that communicates by way of, for example, a 5G network.

The UE 204 or UE 206 may utilize a network to communicate with other computing devices (e.g., mobile device (s), a server(s), a personal computer(s), etc.). In embodiments, the network is a telecommunications network, or a portion thereof. A telecommunications network might include an array of devices or components, some of which are not shown so as to not obscure more relevant aspects of the invention. Components such as terminals, links, and nodes (as well as other components) may provide connectivity in some embodiments. The network may include multiple networks. The network may be part of a telecommunications network that connects subscribers to their immediate service provider. In embodiments, network is associated with a telecommunications provider that provides services to user devices, such as UE 204 or UE 206. For example, the network may provide voice services to user devices or corresponding users that are registered or subscribed to utilize the services provided by a telecommunications provider.

In aspects, tower 202 communicates with one or more user devices, such as UE 204 and/or UE 206. Satellite 208 can also be available to provide service to one or more UEs. As discussed above, the UEs, such as UE 204 and UE 206 can be UTAH-capable UEs, meaning that they can communicate with a UTAH-manager 210 via one or more agents, such as Agent 212 and Agent 214. Agents 212 and 214 can capture information pertaining to their respective UEs and share that information with the manager 210. The agents can push information to the manager 210 or the manager 210 can request or retrieve information from the agents.

As discussed herein, when a UE is further from a source, the UE has to work harder to communicate with the source, much like when people are further from one another they need to yell louder to be heard. UEs have different constraints on power level emissions, also referred to herein as power level thresholds or thresholds. As a UE works harder (i.e., sends more signals) it gets hot. Similarly, a UE can get hot when exposed to hotter environmental temperatures. As the temperature rises, the efficiency decreases. The UTAH-manager 210 can be configured to identify any one of these triggers to adapt the UTP plan of the UE. A trigger can be a manual indication from a user that the UTP plan needs to change. In that case, perhaps the user is not receiving the experience desired so they request a UTP plan evaluation. A trigger can also be an indication that the power level transmitted from the UE is greater than, equal to, or approaching (within a predetermined range) a power level threshold of the UE. Power level thresholds are managed by networks and can be accessible by the UTAH-manager 210 from the tower 202.

Much like UEs, towers also have maximum power levels such that they stop communicating with a UE when they no longer "hear" it. The UTAH-manager 210 can identify that a X power and Y distance, the tower 202 cannot hear UE 204. Assume that the power value X is 5 in this example and the threshold for tower 202 is 3-5. The manager 210 can intelligently shift the power threshold to 5-7 to maintain communication when environmental factors allow for it. For instance, the manager 210 can increase the power levels when environmental conditions are cooler such that the UE 204 will not become too hot. In other words, at the current temperature environment for UE 204, it may be able to operate at a power level 7 the way it would normally operate at a power level 5, so increasing the threshold is appropriate. This may be the case in, for instance, a climate controlled environment such as a vehicle.

In a present example, imagine that UE 204 is getting further and further from tower 202. In order to maintain connection with tower 202, the manager 210 may need to adjust the UTP plan of the UE 204 so that the power emissions of UE 204 are increased in order to maintain the connection with tower 202. In other embodiments, rather than adjusting the UTP plan to maintain a connection with a current service source (e.g., tower 202), the manager 210 can identify a location of at least one upcoming service source and evaluate the power transmission levels necessary to utilize the upcoming service source. If the power levels would exceed those presently used, the manager 210 can eliminate the upcoming service source as a viable source option. If the power levels of the UE would decrease, the manager 210 may coordinate with the agent of the UE, such as agent 212, to establish a new session with the upcoming power source and adjust the UTP plan of the UE as necessary.

The manager 210 can also adjust UTP plans for one or more other devices based on triggers received for a first device. In embodiments, one or more other devices that are determined to be within a predetermined distance of the first device may receive an updated UTP from the manager. The updated UTP plan can mirror, or be exactly the same as, the UTP plan of the first device. A user of the one or more other devices may have previously approved updated to their UTP plan based on proximity to one or more other devices. This may be as a part of a user service agreement or a result of a real-time prompt that is provided to other devices when located in proximity to a UTAH-capable device. In those situations, it can be inferred that the environmental criteria/ factors are the same or similar for the one or more other devices as it is with the first device since they are within a predetermined distance of one another. Thus, the manager 210 can modify UTP plans of one device or a plurality of devices based on a single UTAH-capable device's power evaluation (e.g., environmental factors, historical performance, etc.).

Figure 3:
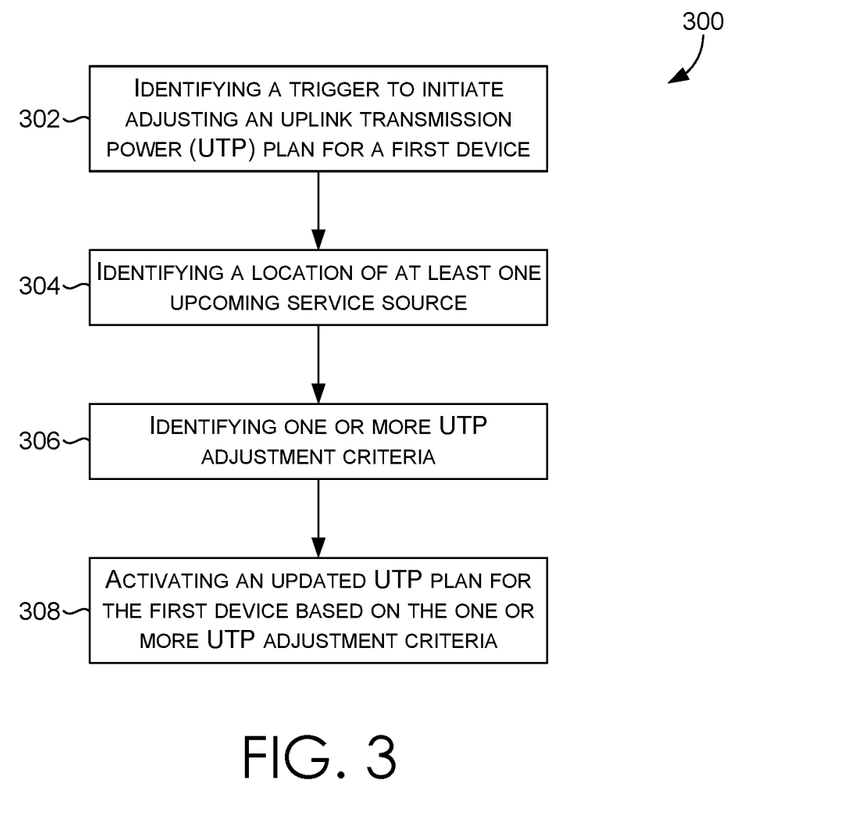
FIG. 3 depicts a flow diagram of a method for managing uplink transmission power plans, in accordance with aspects herein.

Turning to FIG. 3, a flow diagram 300 is provided illustrating a flow to manage uplink transmission power plans. Initially, at block 302, a trigger to initiate adjusting an uplink transmission power (UTP) plan for a first device is identified. A location of at least one upcoming service source is also identified at block 304. An upcoming service source may be a satellite that is approaching or a ground tower that is approaching the current location of the first device and is not currently connected to the first device. At block 306 one or more UTP adjustment criteria is identified. An updated UTP plan is activated for the first device based on the one or more UTP adjustment criteria.

Figure 4:
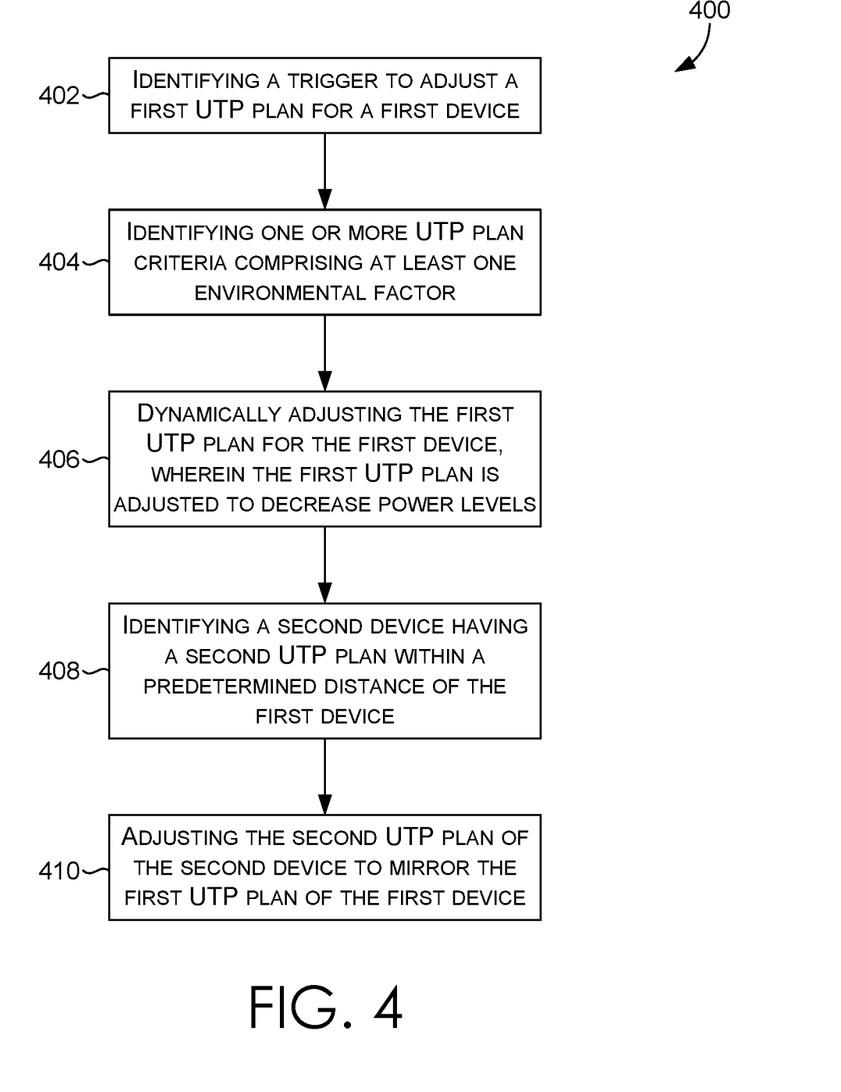
FIG. 4 depicts a flow diagram of a method for managing uplink transmission power plans, in accordance with aspects herein.

Referring to FIG. 4, a flow diagram 400 is provided illustrating a flow to manage uplink transmission power plans. Initially, at block 402, a trigger to adjust a first UTP plan for a first device is identified. At block 404, one or more UTP plan criteria comprising at least one environmental factor is identified. Environmental factors can include a temperature of the first device, a temperature of the environment surrounding the first device (e.g., air temperature), and the like. At block 406, the first UTP plan for the first device is dynamically adjusted, wherein the first UTP plan is adjusted to decrease power levels. A second device having a second UTP plan is identified within a predetermined distance of the first device at block 408. At block 410 the second UTP plan of the second device is adjusted (modified/updated) to mirror the first UTP plan of the first device. A UTP plan that mirrors a different UTP plan is the same as the different UTP plan.

Referring to FIG. 5, a block diagram of an exemplary computing device 500 suitable for use in implementations of the technology described herein is provided. In particular, the exemplary computer environment is shown and designated generally as computing device 500. Computing device 500 is but one example of a suitable computing environment and is not intended to suggest any limitation as to the scope of use or functionality of the invention. Neither should computing device 500 be interpreted as having any dependency or requirement relating to any one or combination of components illustrated. It should be noted that although some components in FIG. 5 are shown in the singular, they may be plural. For example, the computing device 500 might include multiple processors or multiple radios. In aspects, the computing device 500 may be a UE/WCD, or other user device, capable of two-way wireless communications with an access point. Some non-limiting examples of the computing device 500 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 5, computing device 500 includes a bus 510 that directly or indirectly couples various components together, including memory 512, processor(s) 514, presentation component(s) 516 (if applicable), radio(s) 524, input/output (I/O) port(s) 518, input/output (I/O) component(s) 520, and power supply(s) 522. Although the components of FIG. 5 are shown with lines for the sake of clarity, in reality, delineating various components is not so clear, and metaphorically, the lines would more accurately be grey and fuzzy. For example, one may consider a presentation component such as a display device to be one of I/O components 520. Also, processors, such as one or more processors 514, have memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 512 may take the form of memory components described herein. Thus, further elaboration will not be provided here, but it should be noted that memory 512 may include any type of tangible medium that is capable of storing information, such as a database. A database may be any collection of records, data, and/or information. In one embodiment, memory 512 may include a set of embodied computer-executable instructions that, when executed, facilitate various functions or elements disclosed herein. These embodied instructions will variously be referred to as "instructions" or an "application" for short.

Processor 514 may actually be multiple processors that receive instructions and process them accordingly. Presentation component 516 may include a display, a speaker, and/or other components that may present information (e.g., a display, a screen, a lamp (LED), a graphical user interface (GUI), and/or even lighted keyboards) through visual, auditory, and/or other tactile cues.

Radio 524 represents a radio that facilitates communication with a wireless telecommunications network. Illustrative wireless telecommunications technologies include CDMA, GPRS, TDMA, GSM, and the like. Radio 524 might additionally or alternatively facilitate other types of wireless communications including Wi-Fi, WiMAX, LTE, 3G, 4G, LTE, mMIMO/5G, NR, VOLTE, or other VoIP communications. As can be appreciated, in various embodiments, radio 524 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

The input/output (I/O) ports 518 may take a variety of forms. Exemplary I/O ports may include a USB jack, a stereo jack, an infrared port, a firewire port, other proprietary communications ports, and the like. Input/output (I/O) components 520 may comprise keyboards, microphones, speakers, touchscreens, and/or any other item usable to directly or indirectly input data into the computing device 500.

Power supply 522 may include batteries, fuel cells, and/or any other component that may act as a power source to supply power to the computing device 500 or to other network components, including through one or more electrical connections or couplings. Power supply 522 may be configured to selectively supply power to different components independently and/or concurrently.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A system for managing uplink transmission power plans, the system comprising:
   one or more processors; and
   one or more computer-readable media storing computer-usable instructions that, when executed by the one or more processors, cause the one or more processors to:
      identify a trigger to initiate adjusting an uplink transmission power (UTP) plan for a first device;
      identify one or more UTP adjustment criteria; and
      activate an updated UTP plan for the first device based on the one or more UTP adjustment criteria.

2. The system of claim 1, wherein the updated UTP plan increases power levels at the first device.

3. The system of claim 1, wherein the updated UTP plan decreases power levels at the first device.

4. The system of claim 1, wherein the updated UTP plan is adjusted to a value outside of a predetermined range.

5. The system of claim 1, wherein the UTP criteria includes a location of the first device.

6. The system of claim 1, wherein at least one service source is a ground service tower or a satellite cellular service device.

7. The system of claim 1, wherein the UTP criteria includes historical power level performance for at least the first device.

8. The system of claim 1, wherein the UTP criteria includes environmental data including one or more of climate conditions and a power source for the first device.

9. A method for managing uplink transmission power plans, the method comprising:
   identifying a trigger to initiate adjusting an uplink transmission power (UTP) plan for a first device;
   identifying a location of at least one upcoming service source;
   identifying one or more UTP adjustment criteria; and
   activating an updated UTP plan for the first device based on the one or more UTP adjustment criteria.

10. The method of claim 9, wherein the at least one upcoming service source is a ground service tower or a satellite cellular service device.

11. The method of claim 9, wherein the updated UTP plan increases or decreases power levels at the first device.

12. The method of claim 9, wherein the updated UTP plan is adjusted to a value outside of a predetermined range.

13. The method of claim 9, wherein the UTP criteria includes a location of the first device.

14. The method of claim 9, wherein the UTP criteria includes historical power level performance for at least the first device.

15. The method of claim 9, wherein the UTP criteria includes environmental data including one or more of climate conditions and a power source for the first device.

16. The method of claim 9, further comprising:
monitoring the UTP criteria at predetermined time intervals; and
based on the UTP criteria returning to a previous state prior to the activation of the updated UTP plan, deactivating the updated UTP plan and reactivating an original UTP plan.

17. A method for managing uplink transmission power plans, the method comprising:
identifying a trigger to adjust a first UTP plan for a first device;
identifying one or more UTP plan criteria comprising at least one environmental factor;
dynamically adjusting the first UTP plan for the first device, wherein the first UTP plan is adjusted to decrease power levels;
identifying a second device having a second UTP plan within a predetermined distance of the first device; and
adjusting the second UTP plan of the second device to mirror the first UTP plan of the first device.

18. The method of claim 17, wherein the second device has previously approved updates to the second UTP plan based on proximity to one or more other devices.

19. The method of claim 17, wherein the second device shares similar environmental factors with the first device.

20. The method of claim 17, further comprising adjusting one or more additional UTP plans of one or more additional devices that are within a predetermined distance of the first device.

* * * * *